(12) United States Patent
Chang

(10) Patent No.: US 6,826,802 B2
(45) Date of Patent: Dec. 7, 2004

(54) PIVOT BEARING MECHANISM

(75) Inventor: Chin-pao Chang, Taoyuan Hsien (TW)

(73) Assignee: Chun Piao Co., Ltd., Taipei Hsien (TW)

( * ) Notice: Subject to any disclaimer, the term of this patent is extended or adjusted under 35 U.S.C. 154(b) by 0 days.

(21) Appl. No.: 10/352,140

(22) Filed: Jan. 28, 2003

(65) Prior Publication Data

US 2004/0143935 A1 Jul. 29, 2004

(51) Int. Cl.$^7$ .............................................. E05D 11/06
(52) U.S. Cl. ............................ 16/375; 16/252; 16/338
(58) Field of Search .................. 16/337–389, 343–344, 16/252–253, 375, 374

(56) References Cited

U.S. PATENT DOCUMENTS

| | | | | |
|---|---|---|---|---|
| 951,944 A | * | 3/1910 | Farnam | 16/338 |
| 4,490,884 A | * | 1/1985 | Vickers | 16/338 |
| 5,131,779 A | * | 7/1992 | Sen | 16/342 |
| 5,572,769 A | * | 11/1996 | Spechts et al. | 16/337 |
| 5,598,607 A | * | 2/1997 | Katagiri | 16/338 |
| 5,632,066 A | * | 5/1997 | Huong | 16/338 |
| 5,682,645 A | * | 11/1997 | Watabe et al. | 16/338 |
| 6,085,388 A | * | 7/2000 | Kaneko | 16/338 |
| 6,654,985 B1 | * | 12/2003 | Lu | 16/338 |

* cited by examiner

Primary Examiner—Daniel P. Stodola
Assistant Examiner—Christopher Boswell
(74) Attorney, Agent, or Firm—Birch, Stewart, Kolasch & Birch, LLP

(57) ABSTRACT

A pivot bearing mechanism includes a main body and a pivot shaft. The main body is fixedly mounted on a first member, and is provided on a top thereof with an axially extended slit and near the top with an internally threaded hole transversely extended through the slit, such that a screwing element can be tightened into the threaded hole to narrow the slit. The pivot shaft has a first end rotatably supported on the main body and a second end fixedly connected to a second member. By tightening the screwing element into the threaded hole by different degrees, the slit is forced to narrow or widen to allow adjustment of a tightness of contact between the main body and the pivot shaft, allowing the pivot shaft to bring the second member to rotate and locate at a desired position, relative to the first member.

11 Claims, 5 Drawing Sheets

US 6,826,802 B2

PIVOT BEARING MECHANISM

FIELD OF THE INVENTION

The present invention relates to a pivot bearing mechanism, in which a main body is fixedly mounted on a first member and a pivot shaft is rotatably connected at an end to the main body and fixedly connected at another to a second member. The main body is provided with a slit, a width of which may be changed through a screwing element tightened into a threaded hole extending through the slit, so that a tightness of contact between the main body and the pivot shaft may be adjusted by changing the width of the slit. And, the pivot shaft is a hollow member to allow conducting wires to extend therethrough.

BACKGROUND OF THE INVENTION

A conventional pivot bearing mechanism is shown in FIGS. 1 and 2. A first and a second member 11, 12 are provided at predetermined positions with axially projected locating means 111 and 121, respectively. The first member 11 includes a radially projected connecting part 112 for mounting on a base 13, and the second member 12 includes a radially projected connecting part 122 for mounting on an item 14 to be pivotally turned relative to the base 13. A pivot shaft 15 is extended through holes 113, 123 defined in the first and the second member 11 and 12, respectively, so that the second member 12 may bring the item 14 to rotate about the pivot shaft 15 relative to the base 13 until the locating means 111 on the first member 11 abuts on the locating means 121 on the second member 12 to stop the second member 12 and accordingly the item 14 from rotating any further.

In the above-described conventional pivot bearing mechanism, an external force must be applied to the item 14 connected to the second member 12 for the item 14 to rotate until a predetermined stop location is reached. The item 14 is not allowed to stop or locate at an angular position other than that set by the locating means 111, 121. Further, there is not any means for controlling a rotating speed of the second member 12 when the latter is caused to rotate relative to the first member 11. That is, the external force applied to the item 14 has complete control over the rotating speed of the second member 12 relative to the first member 11.

It is therefore tried by the inventor to develop an improved pivot bearing mechanism to eliminate the drawbacks existed in the conventional pivot bearing mechanism.

SUMMARY OF THE INVENTION

A primary object of the present invention is to provide a pivot bearing mechanism, in which a pivot shaft is rotatably supported on a main body with a tightness of contact between the two components being adjustable, so that a second member fixedly connected to the pivot shaft can be rotated and located at any desired angular position relative to a first member to which the main body is fixedly connected.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
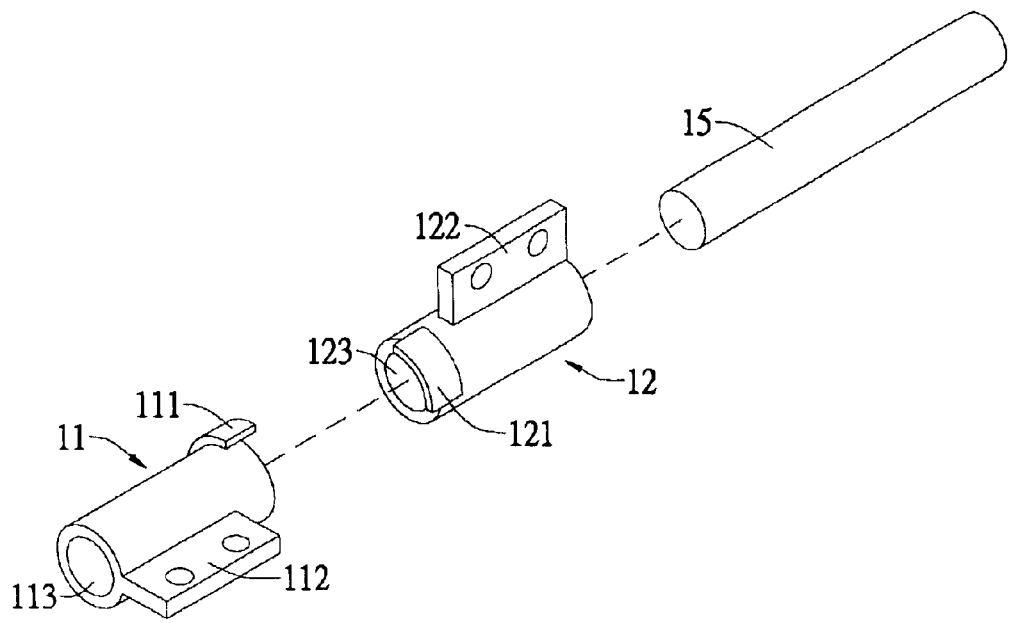
FIG. 1 is an exploded perspective view of a conventional pivot bearing mechanism.
Figure 2:
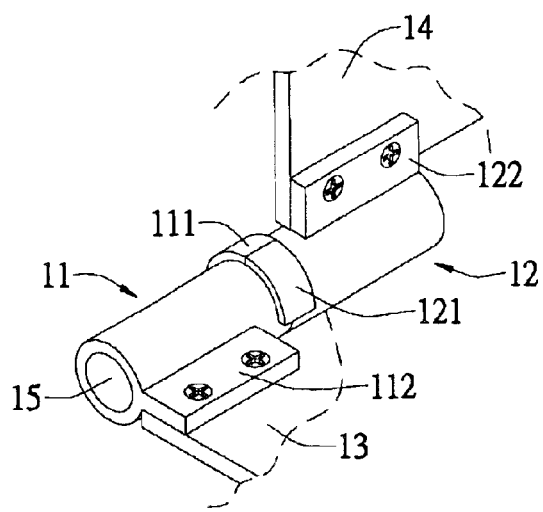
FIG. 2 is an assembled perspective view of the pivot bearing mechanism FIG. 1 having been connected to and between a base and an item to be pivotally turned.
Figure 3:
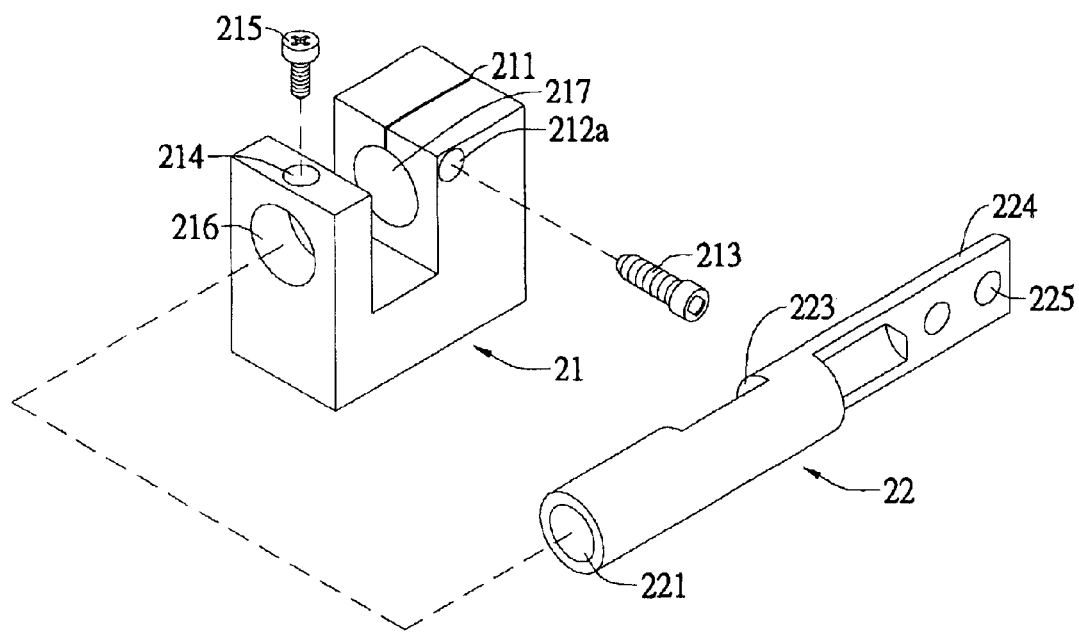
FIG. 3 is an exploded perspective view of a pivot bearing mechanism according to the present invention.
Figure 4:
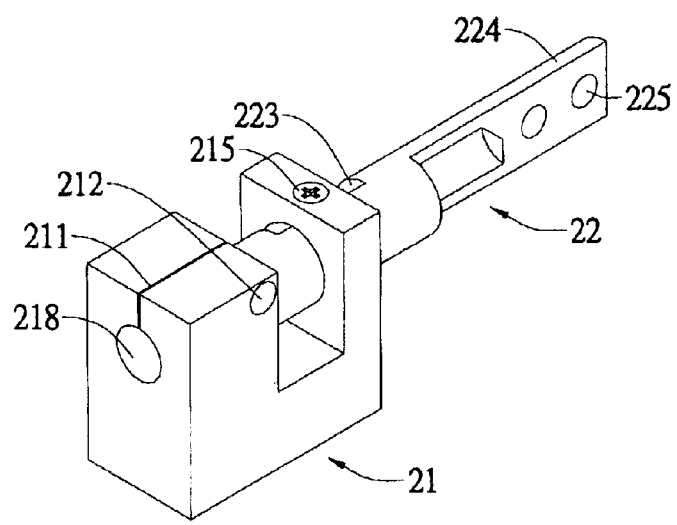
FIG. 4 is an assembled view of FIG. 3.
Figure 5:
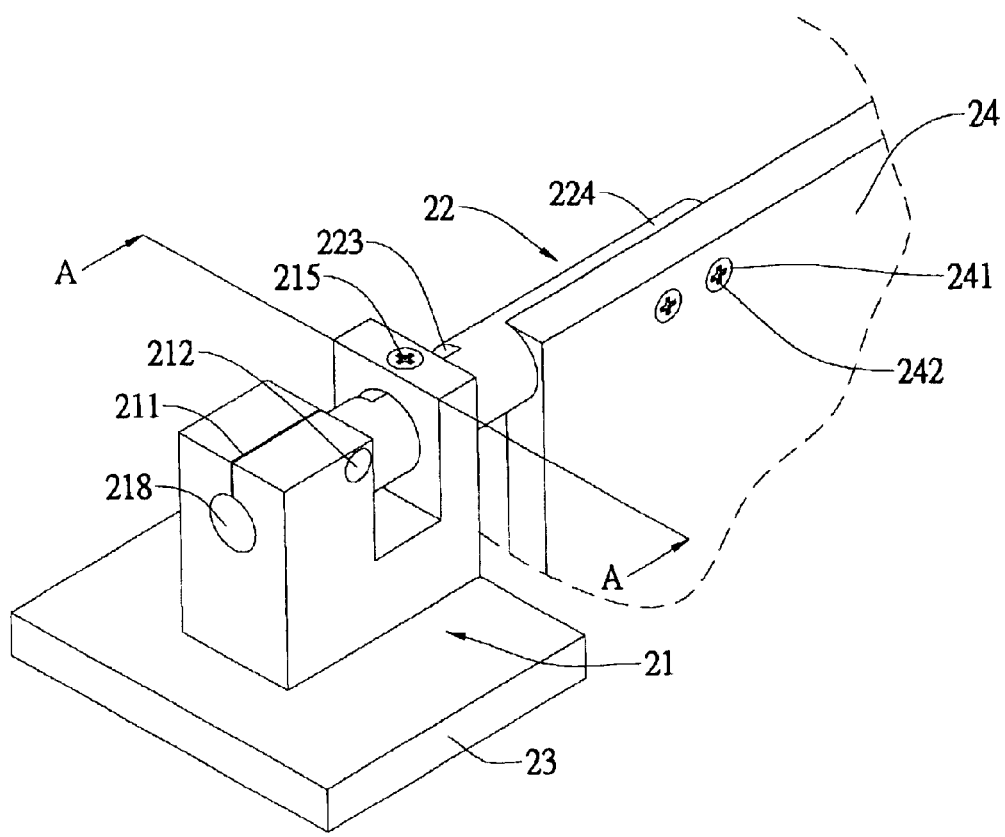
FIG. 5 shows the pivot bearing mechanism of the present invention is connected to and between a first and a second member.

Please refer to FIGS. 3 and 4 that are exploded and assembled perspective views, respectively, of a pivot bearing mechanism according to an embodiment of the present invention. As shown, the pivot bearing mechanism of the present invention mainly includes a U-shaped main body 21 having a first and a second part, and a round pivot shaft 22 supported on the main body 21.

The main body 21 is provided on a top of the first part with an axially extended slit 211, near the top of the first part with a transversely extended threaded hole 212 and a through hole 212a opposite to the threaded hole 212 for a screwing element 213 to screw into the threaded hole 212 via the through hole 212a to narrow or widen the slit 211, and near a middle portion of the first part with an axially extended round channel 217 for the pivot shaft 22 to extend an end therein to. A diameter-reduced round hole 218 is formed on an outer wall of the first part of the main body 21 corresponding to the round channel 217. The main body 21 is also provided on a top of the second part with an internally threaded locating hole 214 for a limiting screw 215 to screw therein to, and near a middle portion of the second part with an axially extended through hole 216 corresponding to the round channel 217 on the first part for the pivot shaft 22 to extend therethrough and into the round channel 217.

The pivot shaft 22 includes a hollow cylindrical part having an axially extended internal through hole 221 and a locating slot 223 provided on a wall thereof, and a connecting arm part 224 extended from an inner end of the cylindrical part. The connecting arm part 224 is provided near an outer end with mounting holes 225.

The pivot shaft 22 is rotatably supported on the main body 21 by screwing the limiting screw 215 through the threaded locating hole 214 on the main body 21 into the locating slot 223 on the pivot shaft 22. The limiting screw 215 extended through the locating hole 214 into the locating slot 223 limits the pivot shaft 22 to rotate relative to the main body 21 within a span defined by a width of the locating slot 223, and prevents the pivot shaft 22 from separating from the main body 21. Meanwhile, the screwing element 213 screwed into the threaded hole 212 on the main body 21 by different extent is adapted to narrow or widen the slit 211 and thereby adjust a tightness by which the axial round channel 217 of the main body 21 clamps around the cylindrical part of the pivot shaft 22 to locate the pivot shaft 22 at a desired angular position relative to the main body 21.

Figure 6:
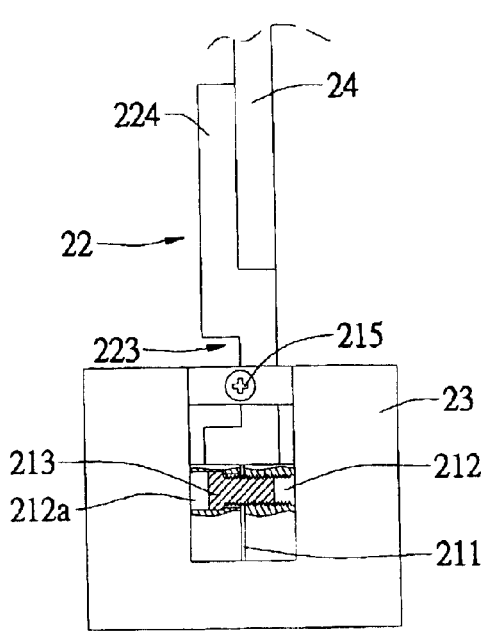
FIG. 6 is a partially sectioned top view of FIG. 5, showing a slit on a main body of the mechanism bearing a pivot shaft is narrowed through tightening of a screwing element.
Figure 7:
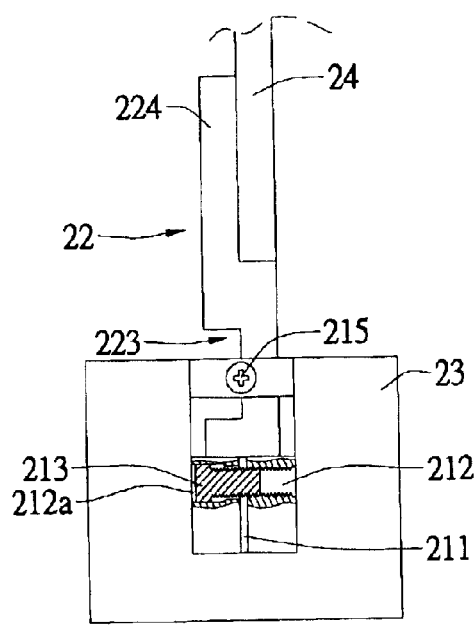
FIG. 7 is another partially sectioned top view of FIG. 5 showing the slit on the main body of the mechanism bearing the pivot shaft is widened through loosening of the screwing element.

To assemble the pivot shaft 22 to the main body 21, first extend an outer end of the cylindrical part of the pivot shaft 22 opposite to the connecting arm part 224 through the axial through hole 216 on the second part of the main body 21 and into the axial round channel 217 on the first part of the main body 21. Then, extend the screwing element 213 through the round through hole 212a into the threaded hole 212 to extend through the slit 211 and set the latter to a desired openness (see FIG. 6). Then, thread the limiting screw 215 through the locating hole 214 on the main body 21 and into the locating slot 223 on the pivot shaft 22.

Please refer to FIGS. 4, 5, 6 and 7. The main body 21 is adapted to fixedly mount on a first member 23, and the connecting arm part 224 of the pivot shaft 22 is adapted to fixedly connect to a second member 24 by threading screwing elements 242 through holes 241 provided on the second member 24 into the mounting holes 225 on the pivot shaft 22. When the pivot shaft 22 is rotated, it brings the second member 24 fixedly connected thereto to rotate relative to the first member 23. When the screwing element 213 is tightened further, it forces the slit 211 to become narrowed and causes the axial round channel 217 to tightly clamp the pivot shaft 22, resulting in an increased frictional force between the pivot shaft 22 and the main body 21, and accordingly, an increased rotary resistance of the pivot shaft 22 to the main body 21. And, when the screwing element 213 is loosened, it allows the slit 211 to become widened and increase a clearance between an inner wall of the round channel 217 and an outer wall of the pivot shaft 22, resulting in a reduced frictional force when the pivot shaft 22 rotates, and accordingly, a decreased rotary resistance of the pivot shaft 22 to the main body 21. That is, by tightening the screwing element 213 to different degrees, the slit 211 may be set to different openness for freely adjusting a tightness of contact between the main body 21 and the pivot shaft 22 and allowing the pivot shaft 22 to locate at a desired position within an allowed span when it is rotated relative to the main body 21.

Figure 8:
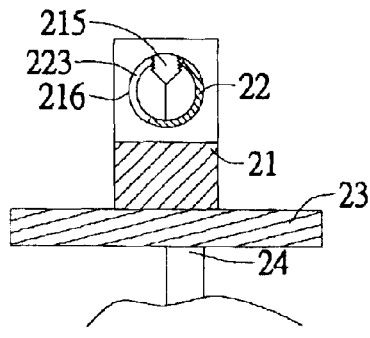
FIG. 8 is a sectional view taken along line A—A of FIG. 5 when the pivot shaft is turned clockwise.
Figure 9:
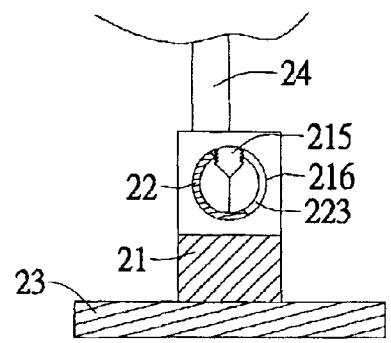
FIG. 9 is another sectional view taken along line A—A of FIG. 5 when the pivot shaft is turned counterclockwise.
Figure 10:
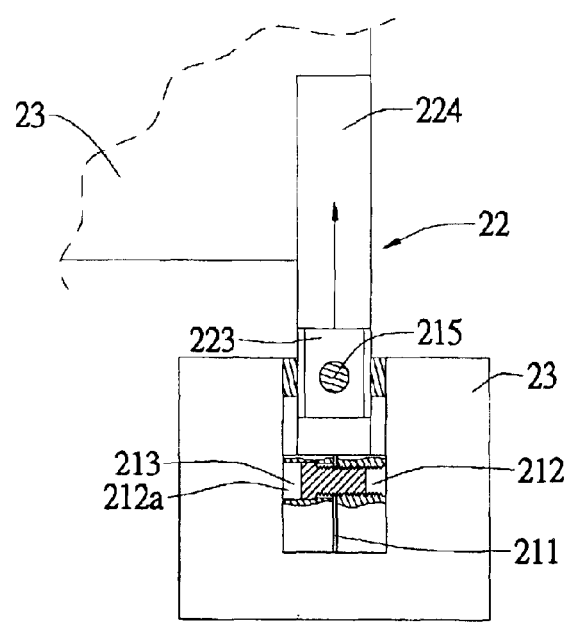
FIG. 10 is a partially sectioned top view of FIG. 5 showing the pivot shaft is stopped by a limiting screw from moving out of the main body.

Please refer to FIGS. 8, 9 and 10. When the pivot shaft 22 brings the second member 24 to rotate relative to the first member 23, either clockwise or counterclockwise, the limiting screw 215 would finally abut on one of two longitudinal edges of the locating slot 223 on the pivot shaft 22, preventing the pivot shaft 22 from turning overly. And, when the pivot shaft 22 axially moves away from the main body 21, the limiting screw 215 would finally abut on an inner transverse edge of the locating slot 223 to prevent the pivot shaft 22 from separating from the main body 21.

Figure 11:
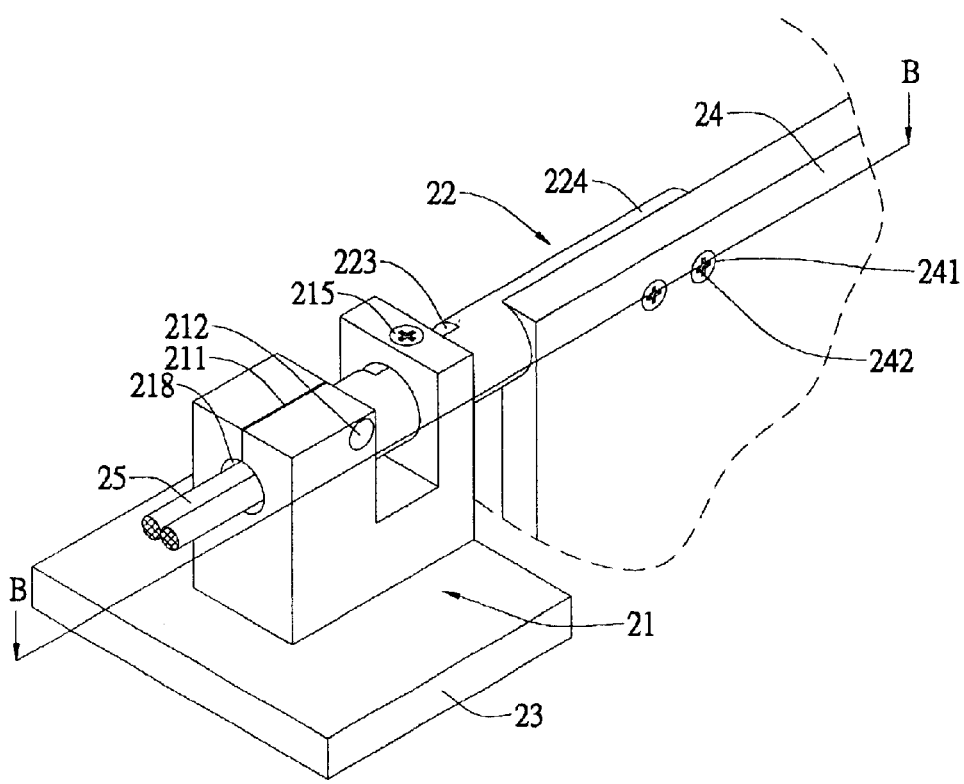
FIG. 11 is similar to FIG. 5 with conducting wires mounted in the hollow pivot shaft of the mechanism of the present invention.
Figure 12:
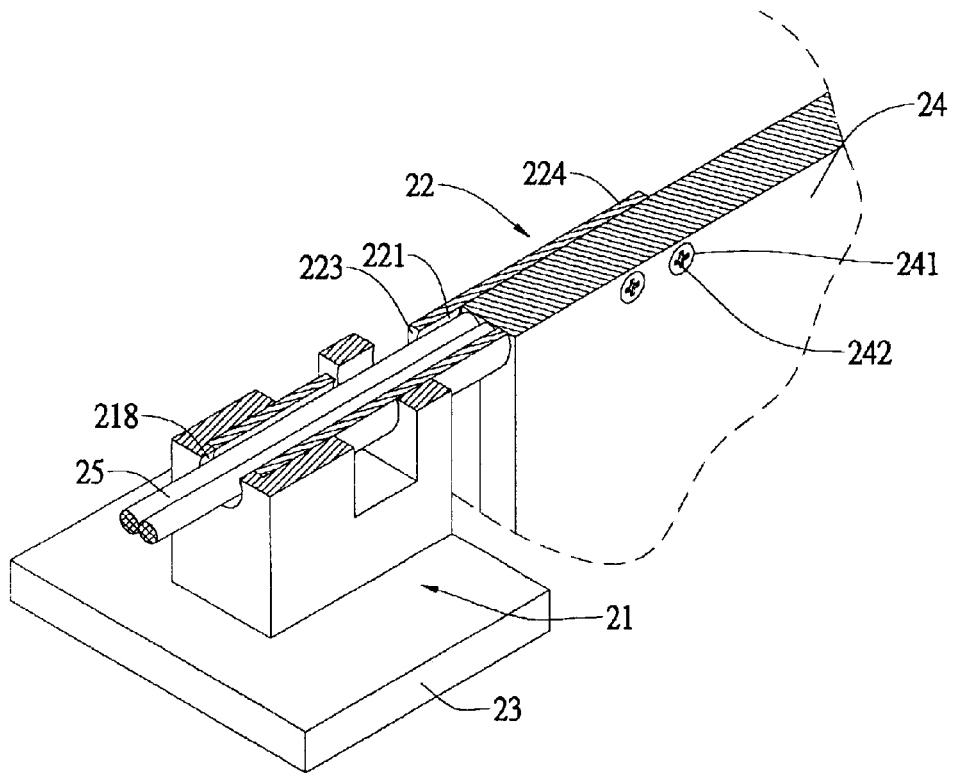
FIG. 12 is a sectioned perspective view taken along line B—B of FIG. 11.

Please refer to FIGS. 11 and 12. Since the pivot shaft 22 is a hollow member defining a through hole 221 therein, it is possible for conducting wires 25 to extend through the pivot shaft 22 before extending out of the main body 21 via the diameter-reduced through hole 218 on the outer wall of the main body 21. In this manner, when the pivot shaft 22 is rotated to bring the second member 24 to rotate relative to the first member 23, the conducting wires 25 mounted in the pivot shaft 22 would not twist, deform, or tangle with one another due to rotation of the pivot shaft 22.

The present invention has been described with a preferred embodiment thereof and it is understood that many changes and modifications in the described embodiment can be carried out without departing from the scope and the spirit of the invention as defined by the appended claims.

What is claimed is:

1. A pivot bearing mechanism, comprising:
   a main body being fixedly mounted on a first member, said main body being provided on a top of a first part thereof with an axially extended slit and near the top with an internally threaded hole transversely extended through said slit, such that a screwing element can be tightened into said threaded hole;
   a limiting screw insertable through the main body; and
   a pivot shaft having a first end rotatably supported on said main body and a second end fixedly connected to a second member, the pivot shaft being engaged by the limiting screw, the limiting screw permitting the shaft to rotate while limiting an amount of rotation of the shaft;
   whereby by tightening said screwing element into said threaded hole by different degrees, said slit is forced to narrow or widen to allow an adjustment of tightness of contact between said main body and said pivot shaft, allowing said pivot shaft to bring said second member to rotate and locate at a desired position relative to said first member.

2. The pivot bearing mechanism as claimed in claim 1, wherein said main body is provided at an outer wall of said first part with a through hole, through which conducting wires maybe extended.

3. The pivot bearing mechanism as claimed in claim 1, wherein said main body is provided on a top of a second part axially opposite to said first part with an internally threaded locating hole, through which the limiting screw is extended into said pivot shaft to limit said pivot shaft to rotate clockwise or counterclockwise only within a predetermined span.

4. The pivot bearing mechanism as claimed in claim 3, wherein said pivot shaft is provided with a locating slot, into which said limiting screw is extended.

5. The pivot bearing mechanism as claimed in claim 1, wherein said first end of said pivot shaft includes a hollow cylindrical part, through which conducting wires can be extended.

6. The pivot bearing mechanism as claimed in claim 1, wherein said second end of said pivot shaft includes a connecting arm part extended from an inner end of a hollow cylindrical part of the pivot shaft for fixedly connecting to said second member.

7. The pivot bearing mechanism as claimed in claim 6, wherein said connecting arm part of said pivot shaft is provided near an outer end with mounting holes, and said second member is fixedly connected to said connecting arm part by extending screwing elements through said second member into said mounting holes.

8. The pivot bearing mechanism as claimed in claim 1, wherein the pivot shaft has a longitudinal axis about which is rotatable and wherein the limiting screw and the screwing element extend in different directions and are perpendicular to the longitudinal axis of the pivot shaft.

9. The pivot bearing mechanism as claimed in claim 1, wherein the pivot shaft has a locating slot having opposed longitudinal edges, the limiting screw only contacting one of the longitudinal edges at an end of rotation of the pivoting shaft.

10. The pivot bearing mechanism as claimed in claim 1, wherein the pivot shaft has a locating slot having opposed longitudinal edges, the limiting screw failing to simultaneously contact both of the longitudinal edges.

11. The pivot bearing mechanism as claimed in claim 1, wherein the screwing element contacts the main body but is free of contact with the first member.

* * * * *